(12) United States Patent
Stadler et al.

(10) Patent No.: US 6,348,225 B1
(45) Date of Patent: Feb. 19, 2002

(54) UNIFORM COUNTRY HAM SLICES AND PROCESS FOR MAKING THE SAME

(75) Inventors: Virgil L. Stadler; Bradley S. Stadler; Martin D. Stadler, all of Burlington, NC (US)

(73) Assignee: SCH Aquisition Sub, Inc., Smithfield, VA (US)

( * ) Notice: Subject to any disclaimer, the term of this patent is extended or adjusted under 35 U.S.C. 154(b) by 0 days.

(21) Appl. No.: 09/520,820

(22) Filed: Mar. 8, 2000

(51) Int. Cl.[7] .............................. A23J 1/02; A22C 7/00
(52) U.S. Cl. ........................ 426/92; 426/282; 426/284; 426/513; 426/514; 426/517; 426/518; 426/646
(58) Field of Search ................................ 426/282, 284, 426/646, 92, 513, 514, 517, 518, 802

(56) References Cited

U.S. PATENT DOCUMENTS

| | | | |
|---|---|---|---|
| 2,107,086 A | 2/1938 | Rumsey, Jr. ................... | 99/174 |
| 2,673,156 A | 3/1954 | Minder ......................... | 99/107 |
| 2,917,388 A | 12/1959 | Sullivan et al. ................ | 99/107 |
| 3,032,421 A | 5/1962 | Buchholz ...................... | 99/109 |
| 3,063,842 A | 11/1962 | Podebradsky ................. | 99/109 |
| 3,290,721 A | 12/1966 | Siegal ........................... | 17/32 |
| 3,635,738 A * | 1/1972 | Hofmann et al. .............. | 99/169 |
| 3,649,300 A * | 3/1972 | Olson et al. ................... | 99/107 |
| 3,901,980 A | 8/1975 | Connick et al. ............... | 426/231 |
| 3,975,548 A | 8/1976 | Fradin .......................... | 426/513 |
| 4,036,997 A | 7/1977 | VerBurg ........................ | 426/272 |
| 4,057,653 A | 11/1977 | Borsuk et al. ................. | 426/513 |
| 4,112,545 A | 9/1978 | Covington et al. ............ | 17/45 |
| 4,210,677 A | 7/1980 | Huffman ....................... | 426/272 |
| 4,363,822 A | 12/1982 | Kleptz .......................... | 426/513 |
| 4,539,210 A | 9/1985 | O'Connell et al. ............ | 426/56 |
| 4,544,560 A * | 10/1985 | O'Connell .................... | 426/104 |
| 4,728,524 A | 3/1988 | Gagliardi, Jr. ................ | 426/272 |
| 4,781,939 A | 11/1988 | Martin et al. ................. | 426/646 |
| 4,943,442 A | 7/1990 | Schack et al. ................ | 426/513 |
| 5,132,137 A | 7/1992 | Reimann et al. .............. | 426/513 |
| 5,322,705 A | 6/1994 | Heeps .......................... | 426/646 |
| 5,344,660 A * | 9/1994 | Stevison et al. .............. | 426/104 |
| 5,472,722 A * | 12/1995 | Burger .......................... | 426/264 |
| 5,489,443 A | 2/1996 | Knipe et al. .................. | 426/264 |
| 5,736,186 A | 4/1998 | Holdren et al. ............... | 426/646 |
| 5,807,598 A * | 9/1998 | Liberman et al. ............ | 426/240 |
| 5,895,674 A * | 4/1999 | Gundlach et al. ............. | 426/92 |
| 6,168,822 B1 * | 1/2001 | Reicks et al. ................. | 426/641 |

* cited by examiner

Primary Examiner—Nina Bhat
(74) Attorney, Agent, or Firm—Womble Carlyle Sandridge & Rice, PLLC; C. Robert Rhodes

(57) ABSTRACT

The present invention provides a method for efficiently making dry-cured meat portions whose weight, size, and shape are easily controlled during manufacturing. The method includes preparing a very thin slice of the cured meat, which is approximately double the size and less than the desired weight of the final portion. To this slice is added a make weight slice of remnants and ham fat, or other binding agent. The "make weight slices" are formed by 1) mixing the lean remnants with semi-emulsified ham fat; 2) placing the mixture into a vacuum stuffer and stuffing the mixture into a fibrous casing; 3) freezing the stuffed casings; and 4) slicing the stuffed casings to form the make weight slices of a desired weight. The make weight slices made according to this method are easy to handle and have a consistent, known weight. The method greatly simplifies the process of making the controlled-weight serving portions.

33 Claims, 4 Drawing Sheets

UNIFORM COUNTRY HAM SLICES AND PROCESS FOR MAKING THE SAME

FIELD OF THE INVENTION

The present invention relates to processing cured meats, and in particular, country ham slices suitable for serving on sandwiches and a process for making the same.

BACKGROUND OF THE INVENTION

Cured meats, and in particular, country hams, are considered a delicacy that has been enjoyed for centuries. As an alternative to refrigeration or other cold storage, various types of meats are cured for preservation. For centuries, ham has been cured using salt. Traditionally, salt-cured hams are referred to as "country" hams. Prior to convenient refrigeration processes, hogs were butchered in the winter in temperate climate zones in the mid-Atlantic where the winters rarely provided days substantially below freezing or above 50° for any extended period of time. The resultant hams were rubbed with salt and stored for winter. The winter temperatures prevented spoiling and provided environmental conditions that began a process of drawing moisture from the ham while causing the salt to penetrate the ham. This osmotic effect continued through spring as the temperatures gradually rose and the humidity decreased, thereby removing more moisture and causing deeper penetration of the salt. As summer approached and the temperatures rose, humidity levels further decreased to finalize the curing process. The result of the dehydration and salt penetration provided a salt-cured ham.

Currently, the curing process occurs throughout the year in temperature and humidity controlled processing facilities. A preferred country ham processing facility is Stadlers Country Hams, Inc. of Elon College, N.C. An exemplary curing process is a 95-day cycle consisting of the three stages. In the first stage, the salt coated ham is refrigerated at 40° Fahrenheit at 80–85% humidity. The second stage of processing refrigerates the hams at 55–60° Fahrenheit at 60% humidity. The third and final stage, stores the hams at 80° fahrenheit at 55–60% humidity. As seen, the process emulates the traditional winter, spring and summer environments facilitating traditional curing.

Cured meats differ drastically from their pressed and formed counterparts. Pressed and formed hams formed in this matter is not dehydrated and poses little difficulty when slicing or otherwise forming serving sizes. Dry curing poses many obstacles when trying to slice, and otherwise form servings of the product. Because a cured ham is truly a dehydrated section of muscle, servings can differ greatly between slices and particular hams. There are essentially five major difficulties in providing tender, uniform slices of country ham. First, country ham can be difficult to bite through due to the dehydrated nature of the product. Second, there is a hole in each slice of the country ham where the bone was removed during processing. Third, due to the natural shape of the muscles of the ham, surface area differs from slice to slice giving the appearance of less ham in certain slices. Fourth, it is very difficult to get an exact portion weight with a whole muscle item like country ham. Fifth, producing a tender, substantially uniform product, is a very labor intensive process.

All of these problems, to various degrees, result in an actual, or at least perceived, quality issue. These issues are exacerbated when tender, uniform portions are necessary for sandwiches provided by restaurants. These restaurants and their customers demand consistency in the quantity and quality of the product. Further, due to the nature of the work force in the service industries, it is difficult for the restaurant to have employees make sandwiches with multiple pieces of country ham in a consistent and customer-pleasing manner.

Furthermore, given the natural preservations process of cured meats, there is a desire to eliminate any type of artificial preservatives or binding agents, which are often used to hold together pieces of meat. Eliminating additives, eliminates the need to list anything on the ingredient label other than the cured meat. Additives in cured meats are generally objectionable to the restaurants and their customers.

As such, there is a need for tender and consistent country ham slices and a process for making the same. There is also a need to eliminate the necessity of binding agents to bind pieces of the cured ham to form a serving portion.

SUMMARY OF THE INVENTION

The present invention provides a method for efficiently making dry-cured meat portions whose weight, size, and shape are easily controlled during manufacturing. The method includes preparing a very thin slice of the cured meat, which is approximately double the size and less than the desired weight of the final portion. To this slice is added a make weight slice of remnants and ham fat, or other binding agent. The "make weight slices" are formed by 1) mixing the lean remnants with semi-emulsified ham fat; 2) placing the mixture into a vacuum stuffer and stuffing the mixture into a fibrous casing; 3) freezing the stuffed casings; and 4) slicing the stuffed casings to form the make weight slices of a desired weight. The make weight slices made according to this method are easy to handle and have a consistent, known weight. The method greatly simplifies the process of making the controlled-weight serving portions. Preferably, the dry-cured meat is country ham. Moreover, flavoring agents may be introduced into the make weight mixture during the mixing step to add honey, maple, sugar or other desired flavors. A particular advantage of this approach is the elimination of any artificial binding agents whose presence on an ingredient listing of a final product would be objectionable to customers. The primary advantage is the consistency and ease of manufacturing of the final product, a tender, consistently uniform portion of country ham.

DETAILED DESCRIPTION OF THE PREFERRED EMBODIMENT

Figure 1:
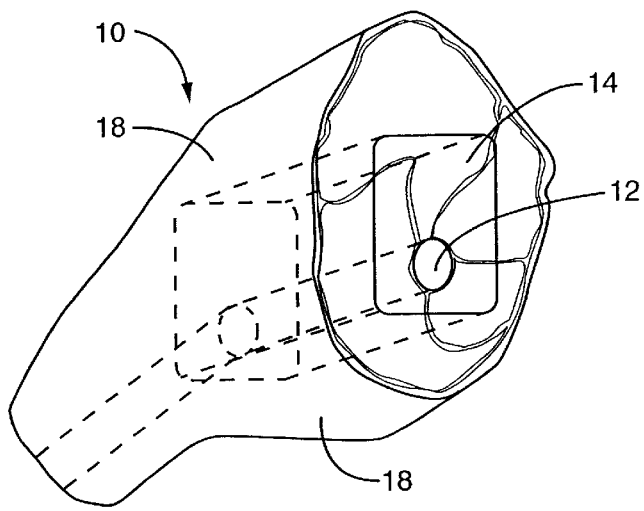
FIG. 1 is a perspective view of a ham.
Figure 2:
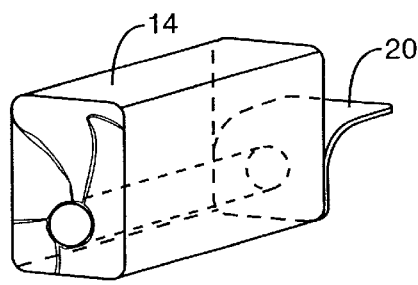
FIG. 2 is a perspective view of a center cut portion of a ham removed according to the present invention.

In the following description, like reference characters designate like or corresponding parts throughout several views. Referring now to the drawings in general and FIG. 1 in particular, it will be understood that the illustrations are for the purpose of describing a preferred embodiment of the invention and are not intended to limit the invention thereto. As shown in FIG. 1, a country ham 10 is shown having a bone 12 and center cut portion 14, both of which are removed during the process of forming serving portions of country ham. The remnants of ham left after removing the center cut portion 14 typically include the end portion 16 and the additional excess 18 surrounding the center cut portion 14. The remnants 16, 18 may be cut into smaller pieces for subsequent processing, as described below.

Figure 4:
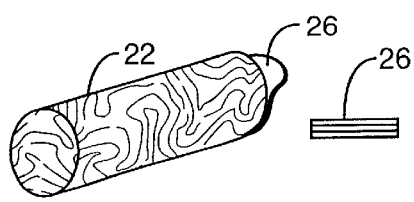
FIG. 4 is a perspective view of the make weight mixture with the casing removed.
Figure 5A:
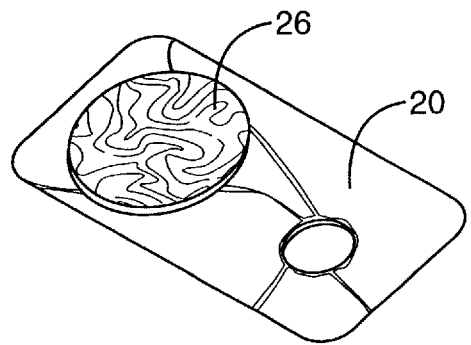
FIGS. 5A through 5C depict the steps of folding center cut slices about a make weight slice to form a serving portion according to the present invention.
Figure 5B:
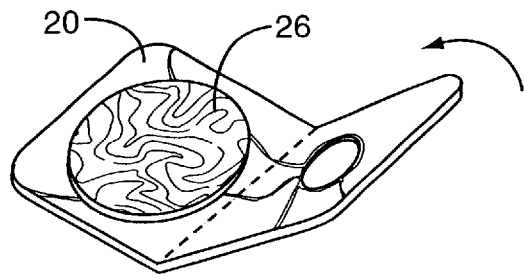
Figure 5C:
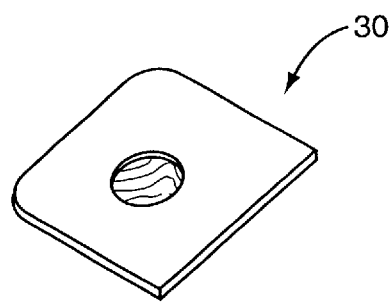
Figure 6A:
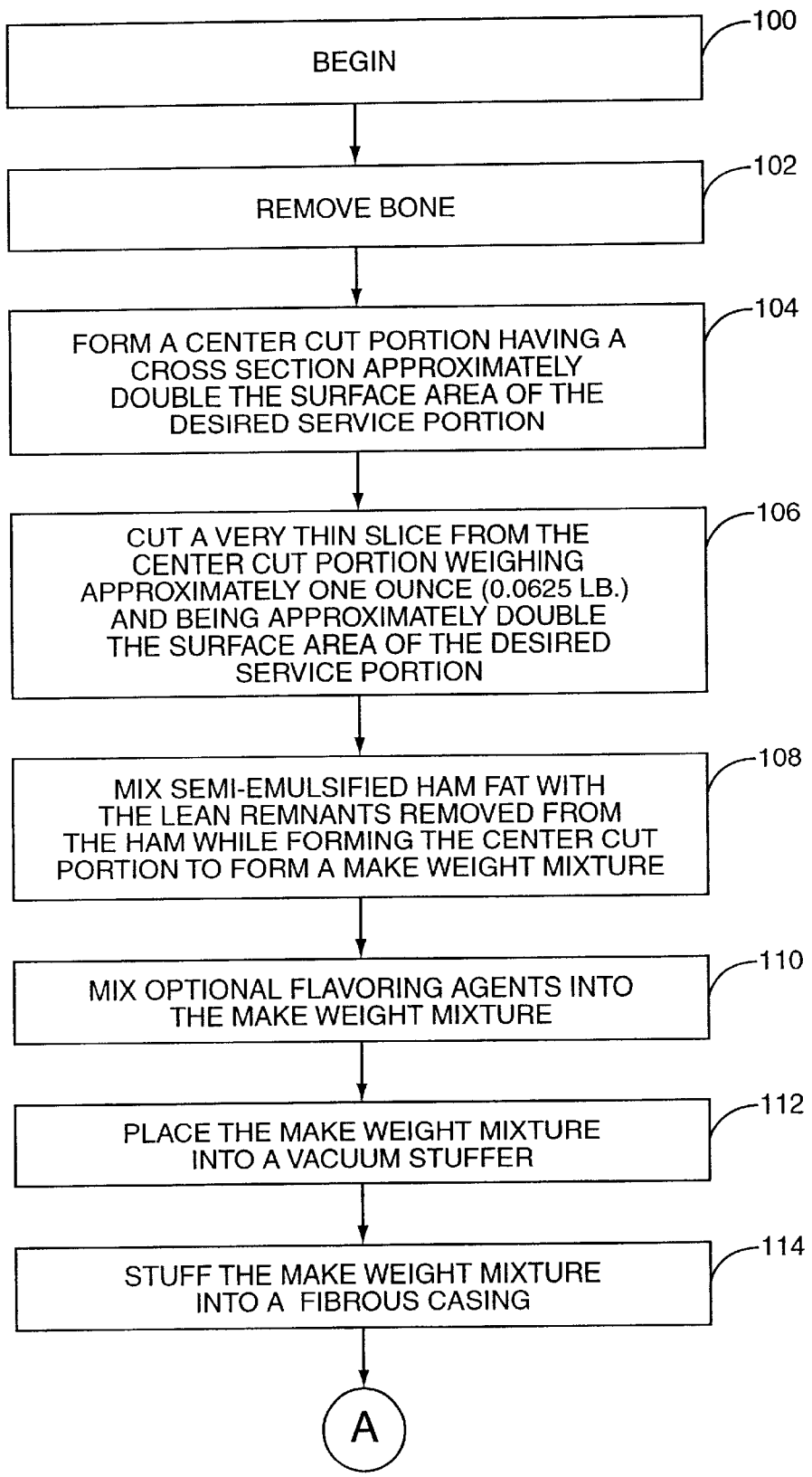
FIGS. 6A and 6B are a flow chart outlining the process for making the serving portions of country ham according to the present invention.
Figure 6B:
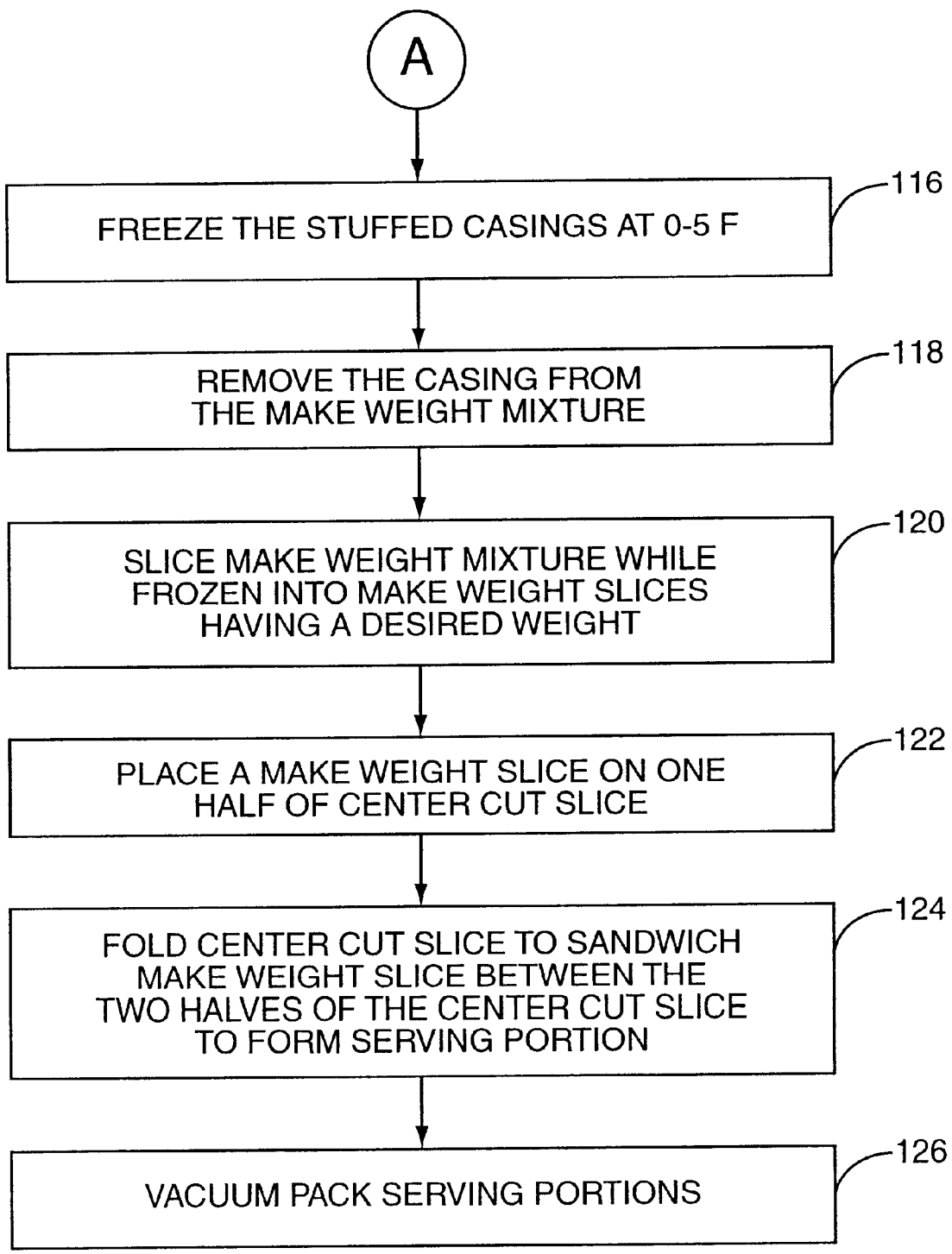

The preferred manufacturing process flow is outlined in FIGS. 6A and 6B. FIGS. 2 through 4 and 5A through 5C illustrate the physical process and should be referred to throughout the description of process flow. The process begins (block 100) by removing the bone 12 (block 102) and forming a center cut portion (block 104) having a cross section approximately double the surface area of the desired service portion. From the center cut portion (block 106), a very thin center cut slice 20 is cut. Each center cut slice 20 is preferably cut to a desired weight, for example, 1 oz. or 0.0625 pounds. A consistent slicing thickness given the uniformity of the center cut portion 14, leads to a consistent center cut portion weight. Notably, the center cut slice 20 is approximately double the surface area of the desired service portion. This slice forms the basis for the ultimate service portion.

The center cut slice preferably weighs a predetermined amount less than the desired service portion. For example, if the final service portion is to weigh 1½ ounces or 0.0938 pounds, something additional must be added to the center cut slice 20 weighing ½ ounce or 0.0313 pounds. The additional weight preferably comes from a mixture of ham fat and lean remnants removed from the ham while forming the center cut portion. This mixture of predefined weight is referred to as a "make weight."

Prior to arriving at the inventive process, smaller pieces or remnants of ham were added to a whole slice, cut from the entire ham. The slice was then folded in half to make a finished portion of sliced ham. This process proved very labor intensive because a person would have to pick up several small remnants to get the exact weight needed for the service portion. Further, containing the smaller pieces within the fold proved extremely difficult. After significant development efforts, it was discovered that mixing semi-emulsified ham fat with chunks a various portions of the lean remnants (block 108) 14 would form a make weight mixture 22. The make weight mixture is an excellent medium for adding optional flavoring agents into the service portion (block 110).

Figure 3:
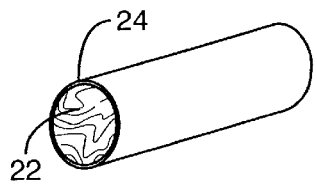
FIG. 3 is a perspective view of an encased make weight mixture according to the present invention.

In order to derive a portion of the make weight mixture of consistent weight, the make weight mixture 22 is placed into a vacuum stuffer (block 112), such as that provided by Urschle Commatrol. The mixture is then stuffed into a fibrous casing 24 (block 114), such as that used for casing processed meats, to form an elongated encased tube, as shown in FIG. 3. The stuffed casing is then frozen, preferably at a temperature between 0 and 5 degrees Fahrenheit for 24 hours (block 116). The casing is then removed from the frozen, make weight mixture 22 (block 118). While frozen, the make weight mixture 22 is sliced into make weight slices (block 120) having a desired weight, which preferably makes up the difference between the center cut slice 20 and the desired serving portion 30 weight. The frozen make weight mixture 22 and make weight slices 26 are depicted in FIG. 4.

The make weight slice 26 is then placed on one half of the center cut slice 20 (block 122), as shown in FIG. 6A. The center cut portion 20 is then folded in half (block 124) to sandwich the make weight slice between the two halves of the center cut slice to form the service portion 30, as shown in FIGS. 5B and 5C. The serving portion 30 is then vacuum packed (block 126) and stored or delivered as desired.

During the above process, the semi-emulsified fat coats the lean remnants while mixing, and when frozen, coagulates to hold the pieces together. This coagulation in combination with the freezing process, provides for precision slicing of the make weight mixture 22. Further, slicing the frozen make weight mixture 22 causes proteins in the make weight mixture to raise to the surface sufficiently to facilitate further bonding with the adjacent surfaces of the center cut slices 20 when sandwiched to form the service portion 30. The result is that the folded, center cut slices 20 and the make weight slices 26 effectively form one, substantially uniform. piece of meat. It should be recognized that certain binding agents can be used to replace the ham fat, however, these chemical additives must be labeled on the ingredient statement, and is often undesirable. Although, potentially undesirable, such a substitution is within the concept of the invention and the scope of the associated claims.

The above process produces a portion of sliced, country ham or other dry-cured meat that is markedly different than any other portion-controlled slice of cured meat. The thin layers make the service portion 30 very tender. The layering and folding substantially covers any natural holes or separations in the service portion 30. The service portions 30 have a very uniform shape and surface area while staying within tight weight tolerances. In food service items, controlling food costs is a major concern. The process of mixing, stuffing, binding and freezing the make weight mixture 22 provides a cured meat product in a cost effective and labor efficient manner. It should be understood that all such modifications and improvements have been deleted herein for the sake of conciseness and readability, and are properly within the scope of the following claims.

We claim:

1. A method for processing a dry-cured meat comprising the steps of:
    (a) cutting a slice from a boneless center portion of dry-cured meat to form a meat slice having adjacent first and second areas;
    (b) mixing a binding agent with pieces of the dry-cured meat from other portions than the boneless center portion to form a mixture;
    (c) stuffing the mixture into a casing to form a stuffed casing;
    (d) freezing the stuffed casing;
    (e) while frozen, cutting a slice from the stuffed casing to form a supplement slice;
    (f) placing the supplement slice on the first area of the meat slice; and
    (g) folding the area of the meat slice over the supplement slice to sandwich the supplement slice between the first and second areas of the meat slice to form a service portion.

2. The method of claim 1 wherein the service portion has a predetermined serving weight, the meat slice is cut to a first predetermined weight, the supplement slice is cut to a second predetermined weight, and the first and second predetermined weights combine to equal the predetermined serving weight.

3. The method of claim 1 wherein the service portion has a predetermined surface area and the meat slice is cut to have an area approximately twice the predetermined surface area prior to folding.

4. The method of claim 1 further comprising the step of removing a center cut portion from a cut of dry-cured meat and wherein the meat slice is cut from the center cut portion.

5. The method of claim 1 further comprising removing the casing from the frozen, stuffed casing.

6. The method of claim 1 further comprising removing the casing from the frozen, stuffed casing prior to cutting the supplemental slice.

7. The method of claim 1 further comprising vacuum packing the service portion.

8. The method of claim 1 wherein the meat slice is cut sufficiently thin to provide a tender meat slice.

9. The method of claim 1 further comprising mixing a flavoring agent into the mixture.

10. The method of claim 1 wherein the mixture is stuffed into a fibrous casing.

11. The method of claim 1 wherein the freezing step includes freezing the stuffed casing at a temperature less than five (5) degree Fahrenheit.

12. The method of claim 1 wherein the freezing step includes freezing the stuffed casing at temperatures between zero (0) and five (5) degree Fahrenheit.

13. The method of claim 1 wherein the dry-cured meat is a country ham.

14. The method of claim 1 wherein the binding agent is semi-emulsified fat.

15. The method of claim 14 wherein no additives are added to the mixture.

16. The method of claim 1 wherein the binding agent is semi-emulsified fat from the dry-cured meat.

17. A method for processing a dry-cured, country ham to form uniform service portions, the method comprising the steps of:
 (a) cutting a slice from a center portion of the country ham with the bone removed to form a meat slice having adjacent first and second areas and a first predetermined weight;
 (b) mixing semi-emulsified country ham fat with pieces of country ham from other portions than the center portion to form a make weight mixture;
 (c) stuffing the make weight mixture into a casing to form a stuffed casing; freezing the stuffed casing;
 (d) while frozen, cutting a slice from the stuffed casing to form a make weight slice having a second predetermined weight;
 (e) placing the make weight slice on the first area of the meat slice; and
 (f) folding the second area of the meat slice over the make weight slice to sandwich the make weight slice between the first and second areas of the meat slice to form a service portion having a predetermined serving weight wherein the first and second predetermined weights substantially combine to equal the serving weight.

18. The method of claim 17 wherein the service portion has a predetermined surface area and the meat slice is cut to have an area approximately twice the predetermined surface area prior to folding.

19. The method of claim 17 further comprising the step of removing a center cut portion from a whole country ham and wherein the meat slice is cut from the center cut portion.

20. The method of claim 17 further comprising removing the casing from the frozen, stuffed casing.

21. The method of claim 17 further comprising removing the casing from the frozen, stuffed casing prior to cutting the supplemental slice.

22. A service portion of country ham formed by a process comprising:
 (a) cutting a slice from a center portion of the country ham with the bone removed to form a meat slice having adjacent first and second areas and a first predetermined weight;
 (b) mixing semi-emulsified country ham fat with pieces of country ham from other portions than the center portion to form a make weight mixture;
 (c) stuffing the make weight mixture into a casing to form a stuffed casing;
 (d) freezing the stuffed casing;
 (e) while frozen, cutting a slice from the stuffed casing to form a make weight slice having a second predetermined weight;
 (f) placing the make weight slice on the first area of the meat slice; and
 (g) folding the second area of the meat slice over the make weight slice to sandwich the make weight slice between the first and second areas of the meat slice to form a service portion having a predetermined serving weight wherein the first and second predetermined weights substantially combine to equal the serving weight.

23. The service portion of claim 22 wherein the service portion has a predetermined surface area and the meat slice is cut to have an area approximately twice the predetermined surface area prior to folding.

24. A service portion of a dry-cured meat formed by a process comprising:
 (a) cutting a slice from a boneless center portion of the dry-cured meat to form a meat slice having adjacent first and second areas;
 (b) mixing a binding agent with pieces of the dry-cured meat from other portions than the boneless center portion to form a mixture;
 (c) stuffing the mixture into a casing to form a stuffed casing;
 (d) freezing the stuffed casing;
 (e) while frozen, cutting a slice from the stuffed casing to form a supplement slice;
 (f) placing the supplement slice on the first area of the meat slice; and
 (g) folding the second area of the meat slice over the supplemental slice to sandwich the supplement slice between the first and second areas of the meat slice to form a service portion.

25. The service portion of claim 24 wherein the service portion has a predetermined serving weight, the meat slice is cut to a first predetermined weight, the supplement slice is cut to a second predetermined weight, and the first and second predetermined weights combine to equal the predetermined serving weight.

26. The service portion of claim 24 wherein the service portion has a predetermined surface area and the meat slice is cut to have an area approximately twice the predetermined surface area prior to folding.

27. A method for processing a make weight portion to add to slices of a predetermined size formed from a boneless center portion of dry-cured meat, the method comprising the steps of:
 (a) mixing a binding agent with pieces of the dry-cured meat from other portions than the center portion to form a mixture;

(b) stuffing the mixture into a casing to form a stuffed casing;

(c) freezing the stuffed casing;

(d) while frozen, cutting a slice from the stuffed casing to form a supplement slice; and (e) sandwiching the supplemental slice between first and second areas of the dry-cured meat slices of a predetermined size to form service portions.

28. A serving portion of boneless dry-cured meat comprising:

(a) a top layer of boneless dry-cured center-cut meat;

(b) a bottom layer of boneless dry-cured center-cut meat; and (c) a middle layer including a mixture of binding agent with pieces of the dry-cured meat from portions of the dry-cured meat other than the center-cut portions sandwiched between said top and bottom layer of dry-cured meat to form a serving portion.

29. The serving portion of claim 28 wherein said top layer and said bottom layer of said dry cured meat is formed from a single meat slice, which is folded around said middle layer.

30. The serving portion of claim 29 wherein the service portion has a predetermined serving weight, the meat slice is cut to a first predetermined weight, the middle layer is formed to a second predetermined weight, and the first and second predetermined weights combine to equal the predetermined serving weight.

31. The serving portion of claim 29 wherein the service portion has a predetermined surface area and the meat slice is cut to have an area approximately twice the predetermined surface area prior to folding.

32. The serving portion of claim 28 wherein said dry-cured meat is country ham.

33. The serving portion of claim 28 wherein said binding agent is semi-emulsified fat of the dry-cured meat.

* * * * *